(12) United States Patent
Iaccino (10) Patent No.: US 8,691,079 B2
(45) Date of Patent: Apr. 8, 2014

(54) COMPRESSION REACTOR AND PROCESS FOR HYDROPROCESSING

(75) Inventor: Larry L. Iaccino, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 528 days.

(21) Appl. No.: 12/689,154

(22) Filed: Jan. 18, 2010

(65) Prior Publication Data

US 2011/0174682 A1 Jul. 21, 2011

(51) Int. Cl.
*C10G 69/06* (2006.01)

(52) U.S. Cl.
USPC .......................................... 208/107; 208/106

(58) Field of Classification Search
USPC .......................................... 208/68, 106–112
See application file for complete search history.

(56) References Cited

U.S. PATENT DOCUMENTS

| | | | |
|---|---|---|---|
| 1,422,038 A | 7/1922 | Day | |
| 1,586,508 A | 5/1926 | Brutzkus | |
| 2,814,551 A | 11/1957 | Broeze et al. | |
| 2,814,552 A | 11/1957 | Van Dijck | |
| 3,839,484 A | 10/1974 | Zimmerman, Jr et al. | |
| 4,134,825 A | 1/1979 | Bearden, Jr. et al. | |
| 4,192,735 A * | 3/1980 | Aldridge et al. | 208/112 |
| 4,226,742 A | 10/1980 | Bearden, Jr. et al. | |
| 4,244,839 A | 1/1981 | Aldridge et al. | |
| 4,740,489 A | 4/1988 | Bearden, Jr. et al. | |
| 5,039,392 A | 8/1991 | Bearden, Jr. et al. | |
| 7,033,569 B2 | 4/2006 | Stickney et al. | |
| 2005/0150817 A1* | 7/2005 | Tallman et al. | 208/78 |
| 2009/0166255 A1 | 7/2009 | Halsey | |

FOREIGN PATENT DOCUMENTS

| | | |
|---|---|---|
| DE | 28 30 824 | 1/1980 |
| GB | 252787 | 6/1926 |

OTHER PUBLICATIONS

Maxim Glouchenkov et al., *Pulsed Compression Technology: A Breakthrough in the Production of Hydrogen*, WHEC 16, Jun. 13-16, 2006, Lyon, France, pp. 1-7.

Maxim Glouchenkov et al., *Pulsed Compression Reactor*, pp. 1-4.

* cited by examiner

*Primary Examiner* — Brian McCaig (57) ABSTRACT

The present invention is directed to a process for hydroprocessing of a liquid hydrocarbon feedstock, comprising: (a) mixing liquid, partially vaporized and/or vaporized hydrocarbon feedstock with molecular hydrogen; (b) feeding said mixture into a compression reactor; (c) compressing said mixture to a pressure, a temperature and for a residence time sufficient to: i) thermally crack at least a portion of hydrocarbon molecules in said hydrocarbon feedstock, and ii) react hydrogen in the presence of a hydrogenation catalyst with unstable portions of the cracked molecules, forming a hydroprocessed product; and (d) expanding said mixture to reduce the pressure and temperature thereby reducing subsequent undesirable reactions.

30 Claims, 3 Drawing Sheets

COMPRESSION REACTOR AND PROCESS FOR HYDROPROCESSING

FIELD OF THE INVENTION

This invention relates to hydroprocessing of liquid hydrocarbon feedstocks under high temperatures and pressures with a compression reactor.

BACKGROUND OF THE INVENTION

As the use of low quality refinery feedstocks has increased, a concomitant need for improved hydroprocessing capacity has accompanied it as these feeds generally result in larger quantities of residual fractions in the refinery. At the same time, the long term needs to cut costs and to make cleaner products represent conflicting requirements. Feed accounts for about 70% of the refining and petrochemical costs therefore the use of less expensive feeds would cut costs. However, less expensive feeds typically have higher sulfur, metals, and aromatics which make them more costly to process. Thus, in order to meet the objective of reducing costs, the heavier crude oil fractions which contain the bulk of the sulfur, metals and aromatics must be processed more efficiently into the more valuable lower boiling fractions such as chemical feedstock.

One of the many types of processes developed for the treatment of residual feeds is the hydroconversion of heavy residual feedstocks in a slurry process using a catalyst prepared in a hydrocarbon oil from a thermally decomposable metal compound catalyst precursor. The catalyst may be formed in situ in the hydroconversion zone or separately as described, for example, in U.S. Pat. Nos. 4,134,825; 4,226,742; 4,244,839; 4,740,489 and 5,039,392 which describe processes of this type using catalysts based on the metals of Groups IVB, VB, VIIB, VIIB and VIII of the CAS Periodic Table (i.e., Groups 4-10 in the IUPAC Periodic Table (2004)), preferably from Groups VB, VIB and VIII (i.e., Groups 5, 6 and 8 through 10 in the IUPAC Periodic Table (2004)).

In the aforementioned process, it is possible to use hydrogen pressures which are far lower than the 1500-3000 psig (about 10,000-21,000 kPag) used in conventional hydroprocessing techniques. At these lower pressures, typically as low as 250 psig (about 1725 kPag), a substantial proportion, typically up to 65 wt. %, of 650° F.+ (345° C.+) resid molecules may be converted to lower boiling range products, e.g., 650° F.− (345° C.−) fractions, using a few hundred parts per million of a dispersed metal on carbon catalyst at 450° C. (about 840° F.). The small amount of catalyst is enough to maintain coke at a manageable level and the hydrogen pressure is low enough that aromatic rings are not saturated, so there is low hydrogen consumption. A significant portion of the feed is converted to lower boiling range products (e.g., products which may be treated as in the 650° F.− (345° C.−) boiling range) which are high in saturated (aliphatic) molecules. The higher boiling range portion of the reaction products (e.g., the 650° F.+ (345° C.+) portion) can then be treated in separate processing in a way which utilizes the favorable characteristics of the hydroconversion products.

While hydroprocessing is most efficient at moderate temperatures and high pressures, the cost of obtaining equipment that can withstand such extreme conditions is prohibitive. Likewise, the cost of associated hardware, such as compressors and heaters, necessary to achieve and maintain these operating parameters is high. Thus, it would be advantageous if a relatively simple and less expensive apparatus could be utilized to conduct hydroprocessing. The cost of producing higher purity hydrogen for use in conventional hydroprocessing is also high so processes which can utilize lower purity hydrogen are also of interest.

Pulse compression reactors are available as means of producing high temperature and high pressure environments for conducting reactions. U.S. Pat. Nos. 2,814,551 and 2,814,552, incorporated herein by reference, disclose improvements in the method of operating and in the construction of reciprocating compression reactors wherein a gas containing or believed to contain a reactant is compressed and promptly thereafter expanded, whereby the reactant is brought for a short time to a high temperature and high pressure. Such may be used to perform chemical reactions, such as cracking of hydrocarbons, synthesis reactions, etc.

"Pulsed Compression Technology: A Breakthrough in the Production of Hydrogen", M. Glouchenkov and A. Kronberg, WHEC 16/Jun. 13-16, 2006, discloses a chemical reactor concept based on the principle of compressive heating and cooling, which permits a breakthrough in many chemical processes at high temperatures and pressures in terms of energy efficiency, capital costs and portability, using a pulsed compression reactor for production of hydrogen by noncatalytic partial oxidation of hydrocarbons. The reference suggests production of hydrogen-containing synthesis gas by feeding methane and oxygen to the pulsed compression reactor and reacting them under high temperature and pressure conditions of the reactor.

SUMMARY OF THE INVENTION

For purpose of this invention and the claims thereto a compression reactor is defined as a device for rapid compression and then subsequent rapid expansion of a gas stream containing reactants. The gas stream may also contain liquid and/or solid phase material. Dependent on the gas stream composition, it is possible to achieve significant heating of the process stream during compression and subsequent cooling during expansion. The device may operate adiabatically, with energy addition, or with energy extraction. A compression reactor may also be referred to as a 'pulse compression reactor', a 'pulsed compression reactor', an 'adiabatic compression reactor', or a 'reciprocating compression reactor'.

In one embodiment, this invention relates to a process, preferably a continuous process, for hydroprocessing of a liquid hydrocarbon feedstock, comprising: (a) mixing liquid, partially vaporized and/or vaporized hydrocarbon feedstock with molecular hydrogen; (b) feeding said mixture into a compression reactor; (c) compressing said mixture to a pressure, a temperature and for a residence time sufficient to: i) thermally crack at least a portion of hydrocarbon molecules in said hydrocarbon feedstock, and ii) react hydrogen in the presence of a hydrogenation catalyst with unstable portions of the cracked molecules, forming a hydroprocessed product; and (d) expanding said mixture to reduce the pressure and temperature thereby reducing subsequent undesirable reactions. In an alternate embodiment the hydrogen is added in gaseous form. In another preferred embodiment, the mixture of hydrocarbon feedstock and hydrogen is heated prior to entry into the compression reactor and hydrogen containing gas may be combined with the hydrocarbon feedstock before or after the preheating or both.

In another embodiment, the present invention is directed to a process, preferably a continuous process, for hydroprocessing of a liquid hydrocarbon feedstock, comprising mixing said hydrocarbon feedstock with a gas containing molecular hydrogen; preheating said mixture to vaporize at least a portion of said hydrocarbon feedstock; feeding said mixture into a compression reactor; compressing said mixture to a pressure, a temperature and for a residence time sufficient to thermally crack at least a portion of hydrocarbon molecules in said hydrocarbon feedstock and react hydrogen in the presence of a hydrogenation catalyst with unstable portions of the cracked molecules, forming a hydroprocessed product; and expanding said mixture to reduce the pressure and temperature thereby reducing subsequent undesirable reactions.

Advantageously, the process further comprises atomizing any unvaporized, preheated hydrocarbons during the feeding step.

In a preferred embodiment, the molecular hydrogen is provided in a gas containing molecular hydrogen and preferably said gas contains at least about 10 mole % hydrogen gas, such as synthesis gas or refinery fuel gas.

During the reaction the mixture is compressed to a pressure between 5 MPa and 101 MPa, a temperature between 600° C. and 1,200° C. and for a residence time between 0.001 second and 10 seconds; and preferably to a pressure between 20 MPa and 50 MPa, a temperature between 700° C. and 1,000° C. and for a residence time between 0.05 second and 2 seconds.

Advantageously, the compression reactor is operated at a compression ratio between 10:1 and 100:1.

In an alternative embodiment, the process further comprises adding additional hydrogen-containing gas and/or steam to the mixture after said preheating step.

Preferably, the process conditions are such that the mole ratio of molecular hydrogen to hydrocarbon feedstock in said mixture is between 1 and 100.

Conveniently the process further comprises withdrawing said hydroprocessed product from said reactor, passing said hydroprocessed product to a separator, separating a vapor phase and a liquid phase, and feeding at least a portion of said vapor phase to a steam cracking furnace for further thermal cracking.

Alternatively, the process can further comprise withdrawing said hydroprocessed product from said reactor, passing said hydroprocessed product to a wash drum, washing said hydroprocessed product to form a vapor phase and a liquid phase, and feeding at least a portion of said vapor phase to a steam cracking furnace for further cracking.

In one embodiment, the process further comprises withdrawing said hydroprocessed product from said reactor, optionally passing said hydroprocessed product to a high pressure separator to recover a hydrogen-containing stream and a liquid stream, and feeding at least a portion of said hydroprocessed product to a steam cracking furnace for further cracking.

Advantageously, the process further comprises reducing the pressure on said liquid stream and passing the reduced pressure stream to a separator, separating a vapor phase and a liquid phase, and feeding at least a portion of said vapor phase to a steam cracking furnace for further thermal cracking.

In an alternative embodiment, at least a portion of said preheating of step is done in the convection section of a steam cracking furnace.

Conveniently, at least a portion of said liquid phase is recycled to the feeding step.

In one embodiment, the catalyst is a stationary catalyst within the pulsed reactor.

In another embodiment, the catalyst is a mobile catalyst introduced into the pulsed reactor, such as where the catalyst is contained within the hydrocarbon and hydrogen mixture.

Conveniently, the hydrogenation catalyst is selected from the group consisting of Mo, Ni, Co, V, Fe, Cu, S, C, O, N, P, Na, K, and/or Cl compounds thereof and combinations thereof.

In another embodiment, the process further comprises withdrawing said hydroprocessed product from said reactor, passing said hydroprocessed product to a separator, flashing said hydroprocessed product to form a vapor phase and a liquid phase containing said mobile, hydrogenation catalyst, and recycling said liquid phase containing said hydrogenation catalyst to the feeding step.

Preferably, said hydrogenation catalyst is deposited on carbonaceous solids formed during the compression and reaction step.

In another embodiment, the process includes mixing steam with said hydrocarbon feedstock during the feeding step, and optionally after withdrawing the reacted mixture from the pulsed compression reactor.

In a preferred embodiment, said hydrocarbon feedstock contains resid.

In another embodiment of the process, at least 40% of the hydrogen is consumed.

In another embodiment, the present invention is directed to a system for hydroprocessing a hydrocarbon feedstock, comprising a hydrocarbon feedstock inlet pipe; a gas inlet pipe; an atomizer having an inlet in fluid communication with both said hydrocarbon feedstock inlet pipe and said gas inlet pipe, and an outlet; and a pulsed compression reactor having an inlet in fluid communication with said atomizer outlet, and a reaction product outlet.

Preferably, the system further comprises a catalyst inlet connected to said hydrocarbon feedstock inlet pipe.

Conveniently, the system further comprises a separator having an inlet in fluid communication with the reaction product outlet, an overhead vapor outlet and a liquid phase outlet.

In another embodiment, the system further comprises a recycle pipe connected between said liquid phase outlet and said catalyst inlet.

Preferably, the system further comprises at least an additional compression reactor in parallel with said compression reactor.

Conveniently, the system further comprises a vapor feed pipe connected between said overhead vapor outlet and an inlet to a steam cracking furnace.

DETAILED DESCRIPTION OF THE EMBODIMENTS

A steam cracking furnace (also referred to as a "steam cracker") is a pyrolysis furnace that has two main sections: a convection section and a radiant section; where hydrocarbon feedstock enters the less severe convection section of the furnace as a liquid (except for light feedstocks which enter as a vapor) and where the feedstock is heated and vaporized by indirect contact with hot flue gas from the radiant section and optionally by direct contact with steam. The vaporized feedstock and steam mixture (if present) is then introduced through crossover piping into the radiant section where it is quickly heated, at pressures typically ranging from about 10 to about 50 psig (69 to 345 kPa), to a severe hydrocarbon cracking temperature, such as in the range of from about 1450° F. (788° C.) to about 1650° F. (900° C.), to provide thorough thermal cracking of the feedstream. The resulting products typically comprise olefins.

Described herein is a process, preferably a continuous process, and apparatus for hydroprocessing liquid hydrocarbon feeds under high temperature and pressure conditions. The process incorporates a compression reactor, which may be an adiabatic, a non-adiabatic, a pulsed, a free piston, or a connected piston reactor. The reactor is preferably a pulsed compression reactor, which, preferably, operates adiabatically. By continuous is meant that the process operates without cessation or interruption. For example, a continuous process to produce olefins would be one where the reactants are continually introduced into one or more reactors and olefin product is continually withdrawn.

While compression reactors generate the pressures needed for hydroprocessing, the residence time in a compression reactor is on the order of seconds or fractions of a second, whereas reactor residence time for conventional hydroprocessing, particularly of heavier crude fractions, is on the order of tens of minutes or even hours. Also pulsed compression reactors previously reported typically feed a vapor stream; not feeds containing resid, which by definition cannot be prevaporized.

Adiabatic compression works based on the $\gamma=Cp/Cv$ of the gas being compressed, where Cp is the specific heat capacity at constant pressure of the gas being compressed and Cv is specific heat capacity at constant volume, and $TV^{\gamma-1}$=constant. In order for change in Volume (V) to give a large change in temperature (T), $\gamma$ must be $\gg 1$, resulting in $Cp-Cv=R$ (where R is the gas constant). So the lower the heat capacity, the greater the Cp/Cv. Monatomic gases (e.g. argon) have Cp/Cv=5/3; diatomic gases (hydrogen) have Cp/Cv=7/5. If the resid in a resid containing feed is in the gas phase (which is questionable at typical feed conditions of 100 psi (689 kPa), 800° F. (427° C.)), then the heat capacity is that of the mixture. $H_2$ at 5:1 molar is less than 10% on a weight basis, so the heat capacity will be very large and the Cp/Cv will be very close to 1.0. That makes $\gamma-1$ about zero, and gives a relationship of $TV^0$=constant. In other words, changes in Volume will not result in temperature change.

If the resid is in the liquid phase, then it cannot participate in adiabatic compression (there is no change in liquid temperature when its pressure is increased). In this case, one can compress hydrogen adiabatically on its own ($\gamma=7/5$) and then simply mix hot hydrogen with feed-temperature resid to determine what reaction temperature may be achieved. With less than 10 wt. % $H_2$ in the system, and the low heat capacity of $H_2$, the resid temperature cannot be raised very much.

Therefore there is need to improve on the operating regime of a compression reactor to get into an operating regime that will allow conversion to occur, after first determining what the appropriate operating regime is and what chemistry/conversion mechanisms will be utilized to perform the conversion.

Figure 1A:
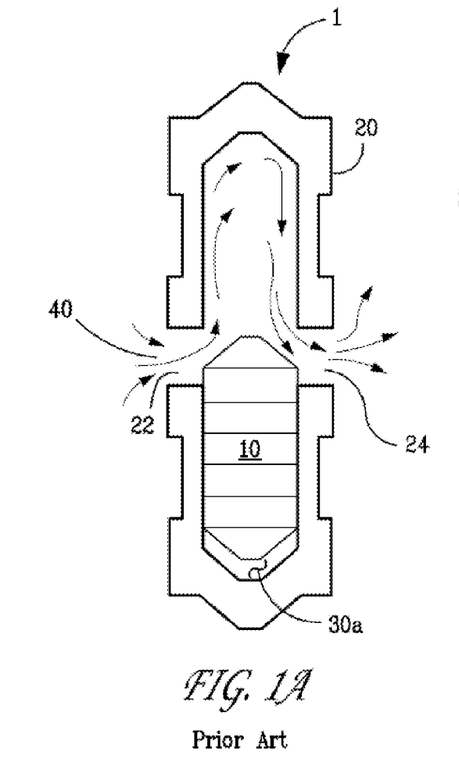
FIG. 1 is a prior art illustration of a pulsed compression reactor useful in the present invention.
Figure 1B:
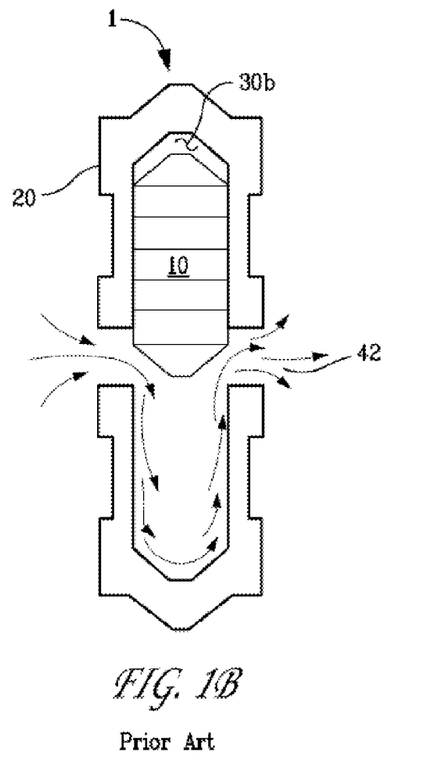

FIGS. 1A and 1B disclose a diagram of a compression reactor 1, which comprises a free piston 10 enclosed within a double-ended cylinder 20, having an inlet port 22 and an outlet port 24. The piston is free to reciprocate between limiting positions so as to form compression chambers 30a and 30b at either end of the cylinder between the end of the free piston and the internal surface of the cylinder end. A feed gas 40 flows across the cylinder in which the free piston, dividing the cylinder into two compression-reaction chambers, reciprocates with a very high frequency, such as up to 400 Hz, compressing in turn the feed in lower and upper chambers. The rapid compression of the gaseous feed in each chamber results in its heating to sufficiently high temperatures to drive chemical reactions. Advantageously, when the chemical reaction is exothermic, the resulting expansion of the reactants acts to force the piston in the opposite direction to compress the reactants in the opposite compression chamber. A reaction product 42 exits outlet port 24. A complete description of the operation of useful pulsed compression reactors may be found in "Pulsed Compression Technology: A Breakthrough in the Production of Hydrogen", M. Glouchenkov and A. Kronberg, WHEC 16/Jun. 13-16, 2006, incorporated herein by reference, wherein the authors describe partial combustion of methane to form synthesis gas.

According to the present invention, liquid hydrocarbon feedstocks, even ones containing resid, may be successfully hydroprocessed in a compression reactor. Suitable liquid hydrocarbon feedstocks for the present invention include, but are not limited to vacuum tower bottoms, resid, fuel oil, knock out pot bottoms, atmospheric tower bottoms, steam cracker tar, whole crude oil, coker products, and/or FCC bottoms. The present invention may also be utilized for processing of renewable feedstocks such as polymer waste and/or bio-oil produced by the pyrolysis of biomass. The term hydrocarbon is defined to also include indigenous molecular species that also include atoms other than carbon and hydrogen; that is, the term hydrocarbon also includes sulfur containing species, nitrogen containing species, oxygen containing species, halogen containing species, and metal containing species.

The term "resid" as used herein refers to the complex mixture of heavy petroleum compounds otherwise known in the art as residuum or residual. Atmospheric resid is the bottoms product produced in atmospheric distillation when the endpoint of the heaviest distilled product is nominally 650° F. (343° C.), and is referred to as 650° F.+ (343° C.+) resid. Vacuum resid is the bottoms product from a column under vacuum when the heaviest distilled product is nominally 1050° F. (566° C.), and is referred to as 1050° F.+ (566° C.+) resid. (The term "nominally" means here that reasonable experts may disagree on the exact cut point for these terms, but probably by no more than +/−50° F. or at most +/−100° F.) This 1050° F.+ (566° C.+) portion contains asphaltenes. Resid as used herein includes the 650° F.+ (343° C.+) resid and the 1050° F.+ (565° C.+) resid unless otherwise specified (note that 650° F.+ resid comprises 1050° F.+ resid).

Resid also typically contains a high proportion of undesirable impurities such as sulfur and nitrogen, as well as high molecular weight ($C_{12^+}$) naphthenic acids (measured in terms of TAN (Total Acid Number) according to ASTM D-664). Yet another advantage of the present invention is that feeds high in one or more of these impurities may be readily processed. As an example of one specific species of impurities, a large amount of sulfur may be tied up in multi-ring heterocycles. By hydrotreating resid containing such species, not only is the sulfur removed as $H_2S$, but the heterocyclic rings are broken up to yield a significant amount of monocyclic aromatic species, which are often valuable commodities by themselves and are also a preferred feed to steam crackers.

The term "hydroprocessing" as used herein is defined to include those processes comprising processing a hydrocarbon feed in the presence of hydrogen to hydrogenate or otherwise cause hydrogen to react with at least a portion of the feed. This includes, but is not limited to, a process comprising the step of heating a resid-containing hydrocarbon feed stream in a hydroprocessing step in the presence of hydrogen, preferably also under pressure. Hydroprocessing may also include but is not limited to the processes known as hydrofining, hydrotreating, hydrodesulfurization (HDS), hydrodenitrogenation (HDN), hydrodeoxygenation (HDO), hydrodearomatization (HDA), hydrodemetalization, and hydrocracking.

According to the present invention, hydroprocessing may preferably be carried out at a temperature and pressure that is more severe than in conventional hydroprocessing processes. In one embodiment, the hydroprocessing may be carried out at pressures between about 50 atm (5 MPa) and about 1,000 atm (101 MPa), even between about 200 atm (20 MPa) and about 500 atm (50 MPa), and at temperatures between about 600° C. and about 1,200° C., or even between about 700° C. and about 1,000° C., such that substantial hydrocarbon resid cracking occurs. Operation at these high temperatures is an element of the invention that allows for processing at reduced residence time compared to conventional hydroprocessing. It is also important to note that conventional hydroprocessing cannot be performed at these temperatures for two reasons: (1) conventional hydroprocessing catalyst will deactivate due to coking very rapidly at these elevated temperatures, and (2) it is not possible to heat to the feedstock to these temperatures without causing fouling of the heating device and/or the inlet section of the hydroprocessing catalyst zone.

The residence times of the reactants in the compression reactor may be between about 0.001 second and about 10 seconds, or even between about 0.05 second and about 2 seconds, preferably even about 1 second, and compression ratios in the reactor may be between about 10:1 and about 100:1; wherein compression ratio is defined as the ratio of inlet pressure to peak pressure.

At the high temperatures and pressures under which the present process may be conducted, it is possible to use relatively low purity hydrogen sources, such as synthesis gas (wherein syngas encompasses $H_2$ and CO and may also include various levels of $CO_2$, $N_2$, $H_2O$, light hydrocarbon, and/or $H_2S$ as well as other contaminants) or refinery fuel gas (wherein refinery fuel gas encompasses $H_2$ and $CH_4$ and may also include various levels of CO, $CO_2$, $N_2$, $H_2O$, light hydrocarbon, and/or $H_2S$ as well as other contaminants), so long as the gas containing molecular hydrogen contains at least about 10 mole % hydrogen gas. The mole ratio of hydrogen to hydrocarbon feedstock should be between about 1:1 and 100:1. Optionally, additional hydrogen-containing gas and/or steam may be added to the preheated feed upstream of reactor 1.

Figure 2:
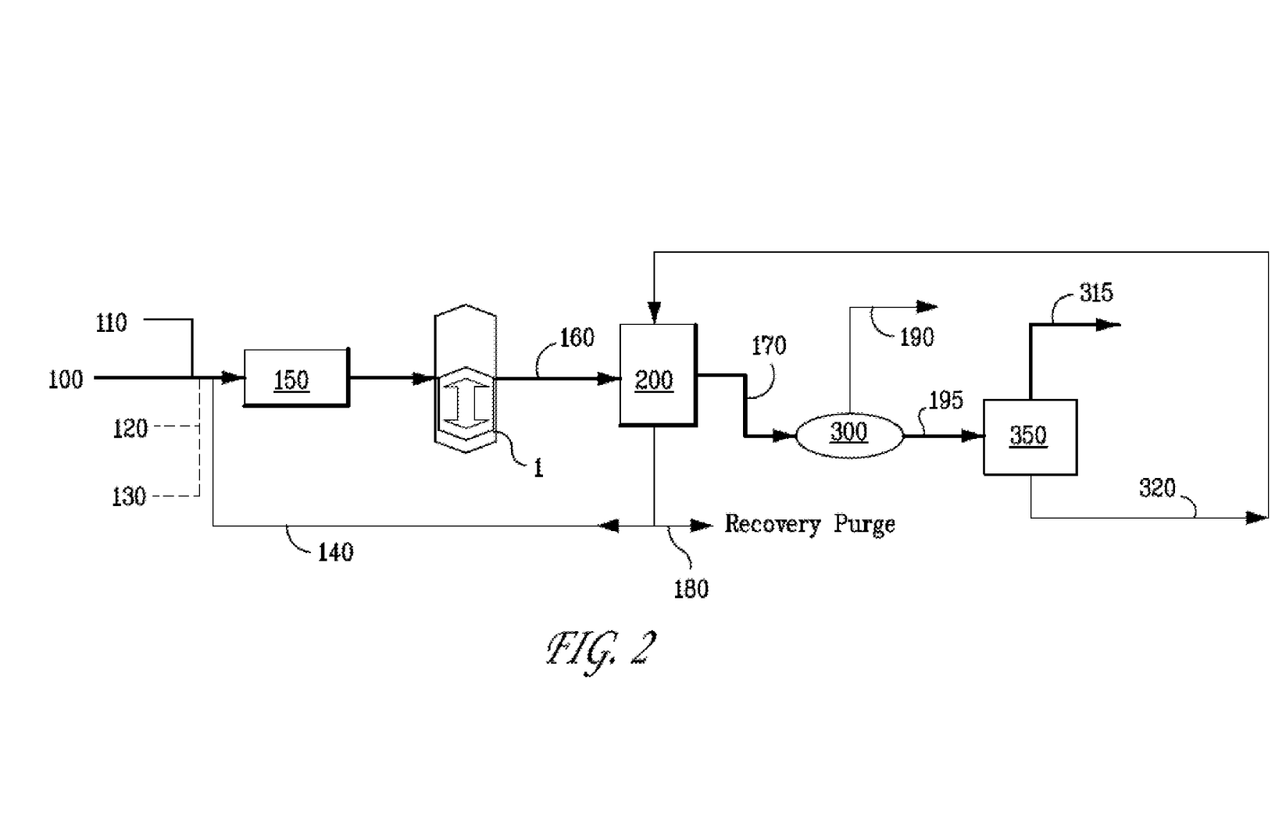
FIG. 2 is a flow diagram of one embodiment of the present invention.

FIG. 2 illustrates a flow path of the present inventive process, wherein a liquid hydrocarbon stream containing resid 100 is combined with a hydrogen source 110, and optionally with steam 120, a catalyst stream 130, and/or a recycle stream 140; and sent to a preheater 150. Optionally the catalyst stream 130, and/or the recycle stream 140 are combined after the preheater 150. Steam dilution may be utilized to adjust the pressure/compression heating window and partial pressures of hydrogen and hydrocarbon.

The resulting mixture is preheated to a temperature sufficient to vaporize at least a portion of the liquid hydrocarbon stream. In a preferred embodiment, any feed remaining in the liquid phase after preheating may be atomized through a suitable apparatus (not shown). The preheated mixture is forwarded to compression reactor 1, wherein hydrocarbons, are thermally cracked at the high temperatures created during the compression cycle. Advantageously, due to the presence of highly pressurized hydrogen gas, hydrogen is added to the cracked molecules to cap the hydrocarbon radicals formed in the thermal cracking phase.

In a preferred embodiment, catalytically active metals/ compounds for hydrogenation, such as Mo, Ni, Co, V, Fe, Cu, S, C, O, N, P, Na, K and/or Cl compounds thereof, and combinations thereof may be added as a mobile catalyst to the distillate feed via stream 130, and/or recycled via stream 140, to enhance the hydrogenation reactions which occur. A mobile catalyst may comprise: (1) a vapor phase species, (2) a liquid phase species; (3) a material dissolved in a hydrocarbon; and/or (4) solid particles of sufficiently small size to be entrained in the hydrocarbon. In a particularly preferred embodiment, the hydrogenation catalysts are deposited on a carbonaceous solid, such as soot formed during the process, which aids in hydrogen transfer. In an alternative embodiment, the hydrogenation catalyst may be a stationary catalyst which is incorporated within combustion chambers 30a and 30b (FIGS. 1A and 1B).

Due to the short residence times and rapid decompression inherent in the compression reactor system, the products leaving the system through line 160 are rapidly quenched, avoiding undesirable chemical recombinations, such as oligomerization or polymerization, of the reaction products. The quenched reaction products are then sent to a wash drum 200, which acts to remove catalyst/soot and uncracked bottoms as a liquid stream from the vaporized product stream, and recycle those liquid by-products via line 140 to the beginning of the process. A portion of the bottoms from the wash may be purged to remove and recover excess soot and metals 180. The soot and metals may be separated or concentrated from the bulk of the bottoms from the wash tower by filtration or centrifugation.

The washed products are passed through line 170, optionally cooled, and sent into a high pressure separator 300 to separate remaining hydrogen-containing gas 190 for potential recycle to the system, or for other refinery uses, and the upgraded liquid hydrocarbon 195, i.e. the hydroprocessed product, may be sent downstream to other refinery processes/ apparatuses 350, such as a steam cracker. In one embodiment, the upgraded liquid hydrocarbon 195 is sent to a vapor/liquid separator or separator 350, wherein at least a portion of the separated hydrocarbon vapors 315 are forwarded to a steam cracker for further cracking, and the separated liquid bottoms 320 are recycled to wash drum 200.

Figure 3:
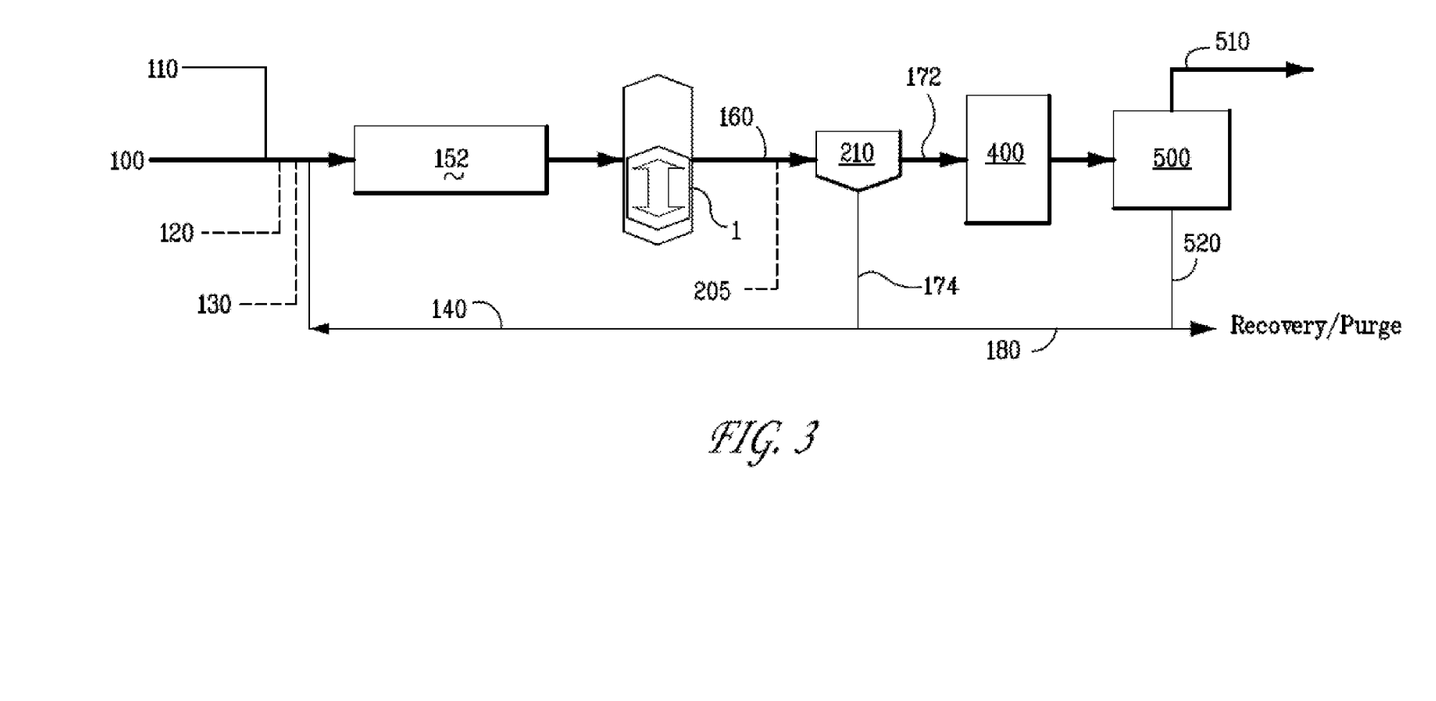
FIG. 3 is a flow diagram of a second embodiment of the present invention.

In another embodiment, illustrated in FIG. 3, the compression reactor 1 is integrated within the flow system of a steam cracking furnace 400, such that the liquid hydrocarbon feed 100 (and hydrogen source 110, optional steam 120, and catalyst system 130) is preheated within a convection section 152 of the steam cracker, passed out of the convection section and into compression reactor 1. The reacted products mixture, comprising the hydroprocessed products, hydrogen and optionally steam and/or catalyst, exit the compression reactor through line 160, wherein steam 205 is optionally added to the mixture, and sent to an integrated separator 210, wherein a vapor phase is separated from a liquid phase, and the vapor phase 172 is sent to the radiant heating section of the steam cracker 400. The recovered liquid phase 174 is sent into recycle stream 140 and/or into purge stream 180. Downstream of the steam cracking furnace 400, the steam cracked effluent is sent to a quench system 500, such as a quench tower, wherein cracked hydrocarbon vapor 510 is separated and sent to recovery, and a heavier bottoms stream 520 is sent to recycle and/or purge through line 180, as desired. In an alternate embodiment of FIG. 3, the integrated separator 210 is deleted from the flowscheme and the entire product 160 of the compression reactor 1 is sent directly to the steam cracker 400 radiant heating section.

It is particularly advantageous if the compression reaction process is conducted under such conditions that at least about 40% of the hydrogen reactant is consumed, even at least about 60%, or even at least about 80%, and even at least about 90% of the hydrogen reactant is consumed.

EXAMPLES

The following examples (Table 1) are provided based upon modeling using the PROII program, which is Simulation Sciences Incorporated PRO/II version 7.1.5 process simulation software. In all examples the feed and product rates are expressed in units of lb-mole/hr. Anthracene is used as a representative of polycyclic aromatic hydrocarbon contained in hydrocarbon resid, and hexatriacontane ($C_{36}H_{74}$) as a representative of heavy hydrocarbon contained in resid-containing feedstocks. For ease of representation, allowable light hydrocarbon products are restricted to benzene (representing single ring aromatics), ethylene & 1-butene (representing light olefins), and ethane & butane (representing light paraffins).

Each numbered example is varied in at least one parameter, such as different feed gases, variations in hydrogen and/or anthracene feed rate, preheat temperature and even liquid feed rate, as compared to the control example. The results are listed in the table below.

water, CO, and/or $N_2$) does not reduce the effectiveness of conversion of the desired species; in fact anthracene conversion is slightly increased, but does slightly shift the product distribution to aromatics.

C. Example 2 shows that hydrogen containing light hydrocarbons may be utilized and the light hydrocarbon preserved as a feed suitable for processing in a steam cracker or other thermal conversion step.

D. Example 4 shows that at higher $H_2$ to anthracene ratio, essentially all the multi-ring aromatics may be converted.

E. Example 5 shows that at reduced $H_2$ to hydrocarbon ratio. Essentially all the $H_2$ may be consumed which could facilitate sending the total product to downstream processing without a $H_2$ separation step.

F. Example 6 shows that at very low $H_2$ to hydrocarbon, essentially all heavy non-aromatic hydrocarbons can still be converted but that multi-ring aromatic hydrocarbons may be produced.

G. Example 7 shows that at lower preheat temperatures, essentially all heavy non-aromatic hydrocarbons can still be converted but that less multi-ring aromatic hydrocarbons are converted.

TABLE 1

| Feed | Control Example | Ex 1 | Ex 2 | Ex 3 | Ex 4 | Ex 5 | Ex 6 | Ex 7 | Ex 8 | Ex 9 |
|---|---|---|---|---|---|---|---|---|---|---|
| Preheat (° C.) | 427 | 427 | 427 | 427 | 427 | 427 | 427 | 204 | 427 | 427 |
| Pressure (MPa) | 0.689 | 0.689 | 0.689 | 0.689 | 0.689 | 0.689 | 0.689 | 0.689 | 0.689 | 0.689 |
| Anthracene | 100 | 100 | 100 | 100 | 10 | 100 | 10 | 100 | 100 | 100 |
| $H_2$ | 500 | 500 | 500 | 500 | 500 | 100 | 10 | 500 | 500 | 500 |
| $C_{36}H_{74}$ | 10 | 10 | 10 | 10 | 10 | 10 | 10 | 10 | 10 | 10 |
| $CH_4$ | | 500 | | | | | | | | |
| $C_2H_6$ | | | 100 | | | | | | | |
| $H_2O$ | | | | 500 | | | | | | |
| CO | | | | | | | | | 500 | 500 |
| $N_2$ | | | | | | | | | | 500 |
| Rxn Conditions | | | | | | | | | | |
| $T_{max}$ (° C.) | 889 | 854 | 852 | 903 | 1049 | 600 | 452 | 646 | 908 | 937 |
| $P_{max}$ (MPa) | 31.0 | 31.0 | 31.0 | 31.0 | 31.0 | 31.0 | 31.0 | 31.0 | 31.0 | 31.0 |
| Products | | | | | | | | | | |
| Anthracene | 31.73 | 29.92 | 28.91 | 28.35 | 0.06 | 85.24 | 16.67 | 49.21 | 28.30 | 27.28 |
| $H_2$ | 98.88 | 128.64 | 107.07 | 160.61 | 303.08 | 4.59 | 0.42 | 17.20 | 168.48 | 233.64 |
| Benzene | 140.66 | 150.67 | 149.25 | 159.47 | 17.94 | 51.05 | 8.36 | 82.02 | 161.01 | 173.97 |
| Ethene | 12.08 | 11.77 | 11.86 | 16.12 | 21.35 | 0.34 | 0.01 | 1.26 | 16.73 | 21.31 |
| Ethane | 215.56 | 201.93 | 306.16 | 182.49 | 169.95 | 123.80 | 101.27 | 275.70 | 177.84 | 143.04 |
| 1-butene | 1.04 | 0.64 | 1.15 | 0.77 | 0.86 | 0.08 | 0.01 | 0.24 | 0.76 | 0.63 |
| butane | 3.10 | 1.77 | 4.76 | 1.48 | 1.36 | 2.93 | 3.45 | 6.02 | 1.39 | 0.76 |
| $C_{36}H_{74}$ | 0 | 0 | 0 | 0 | 0 | 0 | 0 | 0 | 0 | 0 |

The data indicates that product output rates and compositions may be modified by changes in various feedstock parameters and reaction conditions of the compression reactor. For example, the model predicts that under certain conditions, more or less anthracene and/or hydrogen is consumed and converted to products suitable as chemical feedstocks.

By means of further description of the examples given in the table:

A. The control example shows that process conditions may be achieved where: 1) multi-ring aromatics (as represented by anthracene) may be significantly reduced and single ring aromatics (as represented by benzene) produced; and 2) essentially all heavy non-aromatic hydrocarbons (as represented by $C_{36}H_{74}$) may be converted to light hydrocarbons suitable for processing in a steam cracker or other thermal conversion step.

B. Examples 1, 3, 8, and 9 show that use of a hydrogen containing gas of lower purity (i.e., containing methane, In another embodiment, this invention relates to:

1. A process, preferably a continuous process, for hydroprocessing of a liquid hydrocarbon feedstock, comprising:
   (a) mixing liquid, partially vaporized and/or vaporized hydrocarbon feedstock with molecular hydrogen;
   (b) feeding said mixture into a compression reactor;
   (c) compressing said mixture to a pressure, a temperature and for a residence time sufficient to:
      i. thermally crack at least a portion of hydrocarbon molecules in said hydrocarbon feedstock, and
      ii. react hydrogen in the presence of a hydrogenation catalyst with unstable portions of the cracked molecules, forming a hydroprocessed product; and
   (d) expanding said mixture to reduce the pressure and temperature thereby reducing subsequent undesirable reactions.

2. The process of paragraph 1, further comprising preheating the mixture of step (a) prior to feeding the mixture into the compression reactor, preferably to vaporize at least a portion of said hydrocarbon feedstock (preferably at least 10% of said feedstock is vaporized, preferably at least 20%, preferably at least 40%, preferably at least 60% of said feedstock is vaporized).

3. The process of paragraph 1 or 2, further comprising atomizing any unvaporized hydrocarbons during step (b).

4. The process of paragraph 1, 2 or 3, wherein the molecular hydrogen is added as a gas containing at least about 10 mole % hydrogen gas, preferably the gas containing molecular hydrogen is one of synthesis gas or refinery fuel gas.

5. The process of any of paragraphs 1 to 4, wherein the mixture is compressed to a pressure between 5 MPa and 101 MPa, a temperature between 600° C. and 1,200° C., and for a residence time between 0.001 second and 10 seconds.

6. The process of any of paragraphs 1 to 4, wherein the mixture is compressed to a pressure between 20 MPa and 50 MPa, a temperature between 700° C. and 1,000° C., and for a residence time between 0.05 second and 2 seconds.

7. The process of any of paragraphs 1 to 6, wherein the compression reactor is operated at a compression ratio between 10:1 and 100:1.

8. The process of any of paragraphs 1 to 7, further comprising preheating the mixture to vaporize at least a portion of said hydrocarbon feedstock and comprising adding additional hydrogen-containing gas and/or steam to the mixture after preheating the mixture.

9. The process of any of paragraphs 1 to 8, wherein the mole ratio of molecular hydrogen to hydrocarbon feedstock in said mixture is between 1 and 100.

10. The process of any of paragraphs 1 to 9, further comprising withdrawing said hydroprocessed product from said reactor, passing said hydroprocessed product to a separator, separating a vapor phase and a liquid phase, and feeding at least a portion of said vapor phase to a steam cracking furnace for further thermal cracking.

11. The process of any of paragraphs 1 to 9, further comprising withdrawing said hydroprocessed product from said reactor, passing said hydroprocessed product to a wash drum, washing said hydroprocessed product to form a vapor phase and a liquid phase, and feeding at least a portion of said vapor phase to a steam cracking furnace for further cracking.

12. The process of any of paragraphs 1 to 9, further comprising withdrawing said hydroprocessed product from said reactor, and feeding at least a portion of said hydroprocessed product to a steam cracking furnace for further cracking.

13. The process of any of paragraphs 1 to 9, further comprising withdrawing said hydroprocessed product from said reactor, passing said hydroprocessed product to a high pressure separator to recover a hydrogen-containing stream and a liquid stream.

14. The process of paragraph 13, further comprising reducing the pressure on said liquid stream and passing the reduced pressure stream to a knockout drum, separating a vapor phase and a liquid phase, and feeding at least a portion of said vapor phase to a steam cracking furnace for further thermal cracking.

15. The process of any of paragraphs 1 to 14, further comprising preheating the mixture to vaporize at least a portion of said hydrocarbon feedstock, and wherein at least a portion of the preheating is done in the convection section of a steam cracking furnace.

16. The process of paragraph 10, wherein at least a portion of said liquid phase is recycled to step (a).

17. The process of any of paragraphs 1 to 16, wherein the catalyst of step (c) ii. is a stationary catalyst within the compression reactor.

18. The process of any of paragraphs 1 to 16, wherein the catalyst of step (c) ii. is a mobile catalyst introduced into the compression reactor.

19. The process of paragraph 18, wherein said mobile catalyst is contained within the hydrocarbon and hydrogen mixture.

20. The process of any of paragraphs 1 to 19, wherein said hydrogenation catalyst is selected from the group consisting of Mo, Ni, Co, V, Fe, Cu, S, C, O, N, P, Na, K, and/or Cl compounds thereof and combinations thereof.

21. The process of paragraph 18, further comprising withdrawing said hydroprocessed product from said reactor, passing said hydroprocessed product to a separator, flashing said hydroprocessed product to form a vapor phase and a liquid phase containing said mobile, hydrogenation catalyst, and recycling said liquid phase containing said hydrogenation catalyst to step (a).

22. The process of paragraph 21, wherein said hydrogenation catalyst is deposited on carbonaceous solids formed during step (c).

23. The process of any of paragraphs 1 to 22, further comprising mixing steam with said hydrocarbon feedstock.

24. The process of any of paragraphs 1 to 23, wherein said hydrocarbon feedstock contains resid.

25. The process of any of paragraphs 1 to 24, wherein at least 40% of the hydrogen is consumed, preferably at least about 60%, preferably at least about 80%, or preferably at least about 90% of the hydrogen reactant is consumed.

26. A system, preferably continuous, for hydroprocessing a hydrocarbon feedstock, comprising:
   (a) a hydrocarbon feedstock inlet pipe;
   (b) a gas inlet pipe;
   (c) an atomizer having an inlet in fluid communication with both said hydrocarbon feedstock inlet pipe and said gas inlet pipe, and an outlet; and
   (d) a compression reactor having an inlet in fluid communication with said atomizer outlet, and a reaction product outlet.

27. The system of paragraph 26, further comprising a catalyst inlet connected to said hydrocarbon feedstock inlet pipe.

28. The system of paragraph 26 or 27, further comprising a separator having an inlet in fluid communication with the reaction product outlet, an overhead vapor outlet and a liquid phase outlet.

29. The system of any of paragraphs 26 to 28, further comprising a recycle pipe connected between said liquid phase outlet and said catalyst inlet.

30. The system of any of paragraphs 26 to 29, further comprising at least an additional compression reactor in parallel with said compression reactor.

31. The system of any of paragraphs 26 to 30, further comprising a vapor feed pipe connected between said overhead vapor outlet and an inlet to a steam cracking furnace.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention. All documents described herein are incorporated by reference herein, including any priority documents and/or testing procedures to the extent they are not inconsistent with this text, provided however that any priority document not named in the initially filed application or filing documents is NOT incorporated by reference herein. Further, the term "comprising" is considered synonymous with the term "including" for purposes of Australian law.

The invention claimed is:

1. A process for hydroprocessing of a liquid hydrocarbon feedstock, comprising:
   (a) mixing liquid, partially vaporized and/or vaporized hydrocarbon feedstock with molecular hydrogen;
   (b) feeding said mixture into a compression reactor;
   (c) adiabatically compressing said mixture in said compression reactor to a pressure, a temperature and for a residence time sufficient to:
      i. thermally crack at least a portion of hydrocarbon molecules in said hydrocarbon feedstock, and
      ii. react hydrogen in the presence of a hydrogenation catalyst with unstable portions of the cracked molecules, forming a hydroprocessed product; and
   (d) expanding said mixture to reduce the pressure and temperature thereby reducing subsequent undesirable reactions;
   wherein said feeding of said mixture into said compression reactor occurs prior to a compression stroke.

2. The process of claim 1, further comprising preheating the mixture of step (a) before feeding said mixture into the compression reactor.

3. The process of claim 2, further comprising adding additional hydrogen-containing gas and/or steam to the mixture after preheating the mixture.

4. The process of claim 2, wherein at least a portion of the preheating is done in the convection section of a steam cracking furnace.

5. The process of claim 2, wherein at least a portion of the hydrocarbon feedstock is vaporized during preheating.

6. The process of claim 1, wherein the molecular hydrogen is added as a gas containing at least about 10 mole % hydrogen gas.

7. The process of claim 3, wherein the gas containing molecular hydrogen is one of synthesis gas or refinery fuel gas.

8. The process of claim 1, wherein the mixture is compressed to a pressure between 5 MPa and 101 MPa, a temperature between 600° C. and 1,200° C., and for a residence time between 0.001 second and 10 seconds.

9. The process of claim 1, wherein the mixture is compressed to a pressure between 20 MPa and 50 MPa, a temperature between 700° C. and 1,000° C., and for a residence time between 0.05 second and 2 seconds.

10. The process of claim 1, wherein the compression reactor is operated at a compression ratio between 10:1 and 100:1.

11. The process of claim 1, wherein the mole ratio of molecular hydrogen to hydrocarbon feedstock in said mixture is between 1 and 100.

12. The process of claim 1, further comprising withdrawing said hydroprocessed product from said reactor, passing said hydroprocessed product to a separator, separating a vapor phase and a liquid phase, and feeding at least a portion of said vapor phase to a steam cracking furnace for further thermal cracking.

13. The process of claim 12, wherein at least a portion of said liquid phase is recycled to step (a).

14. The process of claim 1, further comprising withdrawing said hydroprocessed product from said reactor, passing said hydroprocessed product to a wash drum, washing said hydroprocessed product to form a vapor phase and a liquid phase, and feeding at least a portion of said vapor phase to a steam cracking furnace for further cracking.

15. The process of claim 1, further comprising withdrawing said hydroprocessed product from said reactor and feeding at least a portion of said hydroprocessed product to a steam cracking furnace for further cracking.

16. The process of claim 1, further comprising withdrawing said hydroprocessed product from said reactor, passing said hydroprocessed product to a high pressure separator to recover a hydrogen-containing stream and a liquid stream.

17. The process of claim 16, further comprising reducing the pressure on said liquid stream and passing the reduced pressure stream to a knockout drum, separating a vapor phase and a liquid phase, and feeding at least a portion of said vapor phase to a steam cracking furnace for further thermal cracking.

18. The process of claim 1, wherein the catalyst of step (c) ii. is a stationary catalyst within the compression reactor.

19. The process of claim 1, wherein the catalyst of step (c) ii. is a mobile catalyst introduced into the compression reactor.

20. The process of claim 19, wherein said mobile catalyst is contained within the hydrocarbon and hydrogen mixture.

21. The process of claim 19, further comprising withdrawing said hydroprocessed product from said reactor, passing said hydroprocessed product to a separator, flashing said hydroprocessed product to form a vapor phase and a liquid phase containing said mobile, hydrogenation catalyst, and recycling said liquid phase containing said hydrogenation catalyst to step (a).

22. The process of claim 21, wherein said hydrogenation catalyst is deposited on carbonaceous solids formed during step (c).

23. The process of claim 1, wherein said hydrogenation catalyst is selected from the group consisting of Mo, Ni, Co, V, Fe, Cu, S, C, O, N, P, Na, K, and/or Cl compounds thereof and combinations thereof.

24. The process of claim 1, further comprising mixing steam with said hydrocarbon feedstock.

25. The process of claim 1, wherein said hydrocarbon feedstock contains resid.

26. The process of claim 1, wherein at least 40% of the hydrogen is consumed.

27. The process of claim 1, further comprising atomizing any unvaporized hydrocarbons during step (b).

28. The process of claim 1, wherein at least 60% of the hydrogen is consumed.

29. The process of claim 1, wherein at least 80% of the hydrogen is consumed.

30. The process of claim 1, wherein the process is a continuous process.

* * * * *